United States Patent

[11] 3,557,958

| [72] | Inventor | Jesse A. Baldwin<br>Kearney, Nebr. |
|---|---|---|
| [21] | Appl. No. | 763,173 |
| [22] | Filed | Sept. 27, 1968 |
| [45] | Patented | Jan. 26, 1971 |

[54] ANTI-DRAINBACK VALVE MEANS FOR OIL FILTERS
4 Claims, 3 Drawing Figs.

[52] U.S. Cl...................................................... 210/136, 210/443
[51] Int. Cl....................................................... B01d 27/00
[50] Field of Search.......................................... 210/136, 440, 443, 130, 132T.U.and P.F.F.F(Digests)

[56] References Cited
UNITED STATES PATENTS

| 3,332,554 | 7/1967 | Humbert, Jr. ................ | 210/136X |
| 3,339,738 | 9/1967 | Wilhelm ....................... | 210/136 |
| 3,367,507 | 2/1968 | Hultgren ...................... | 210/443X |
| 3,426,900 | 2/1969 | Wilkinson et al. ............. | 210/440X |

Primary Examiner—Frank A. Spear, Jr.
Attorney—J. Harold Kilcoyne

ABSTRACT: Antidrainback valve means for automotive engine mounted oil filters comprising a valve element in the form of an annulus of flexible rubberlike material secured along its inner edge to the inner face of the filter shell base plate and extending radially outwardly therefrom in normal covering relation to the oil inlet openings provided in said base plate and having outer edge diameter slightly greater than that of a circular line form seat provided therefor on the inner face of the base plate, and annular spring means interposed and reactive between the filter element within the filter shell and said outer peripheral portion of said valve annulus normally to maintain said peripheral portion seated on said line form seat.

PATENTED JAN 26 1971

INVENTOR
JESSE A. BALDWIN,

BY J. Harold Kiearne
ATTORNEY

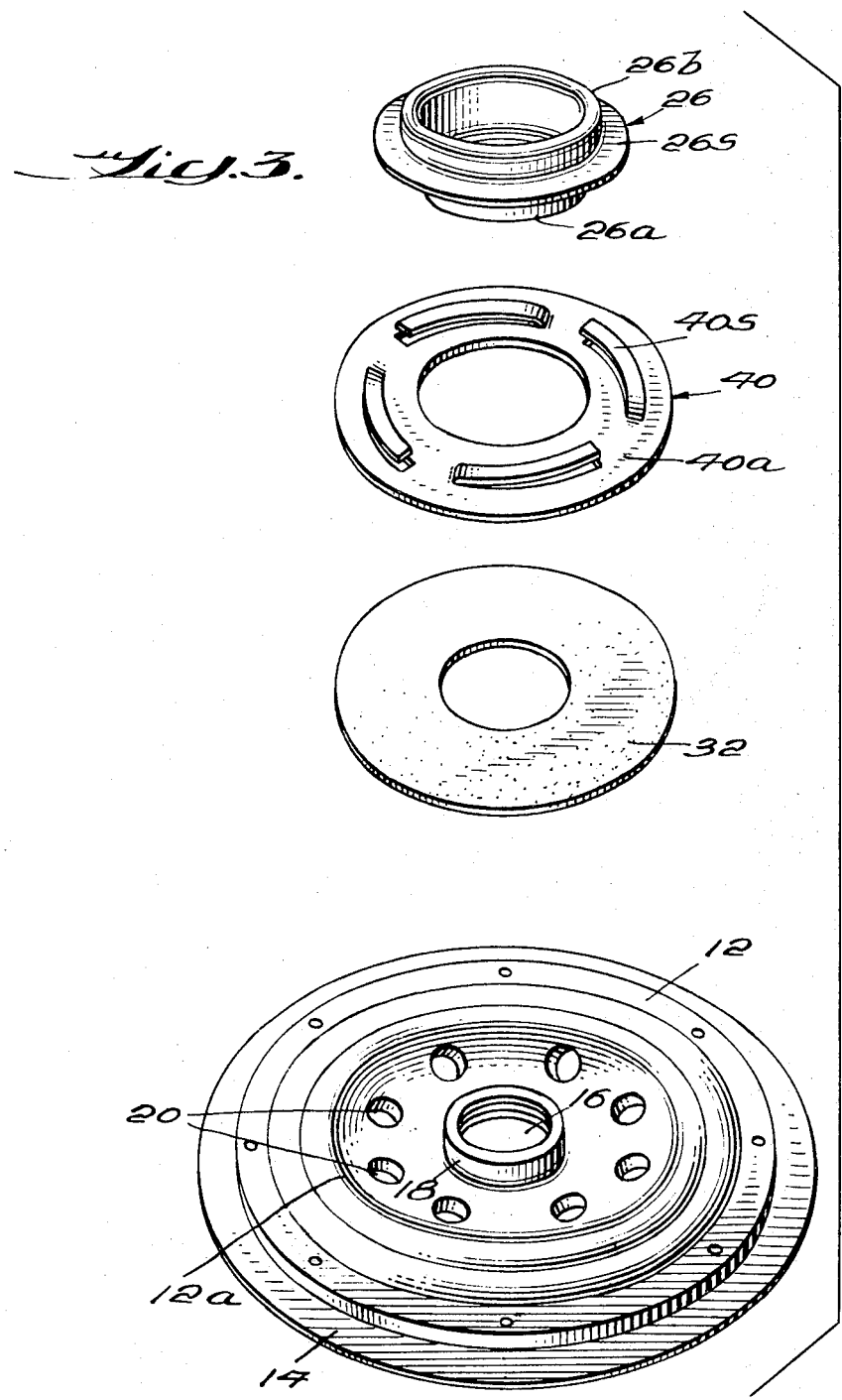

ANTI-DRAINBACK VALVE MEANS FOR OIL FILTERS

This invention relates to improvements in automotive oil filters, and more particularly, to an improved antidrainback valve means for incorporation in such a filter.

Among the objects of the present invention may be noted the provision of improved antidrainback valve means for automotive oil filters characterized by superior valve element-seating properties; the provision of an antidrainback valve means for automotive oil filters constructed and arranged so that the valve element thereof is not subject to being held open or partly open by contaminants which may be entrained in the entering oil lodging under said valve element; the provision of antidrainback valve means for automotive oil filters characterized by the valve element, which is in the nature of a flexible rubber or rubberlike annulus normally making line contact only with its seating surface; the provision of antidrainback valve means for automotive oil filters which is inexpensive in fabrication and is further easy to assemble; and the provision of a novel assembly of a base plate, adapter bushing, valve annulus and valve-closing spring constituting an effective antidrainback valve means for automotive oil filters.

The above and other objects and features of advantage of the improved antidrainback valve means for automotive oil filters according to the invention will appear from the following detailed description thereof, taken with the accompanying illustrative drawing: wherein FIG. 1 is a broken-away part-sectional view of an automotive oil filter incorporating an improved antidrainback valve means as herein contemplated;

FIG. 3 is an exploded view of the parts making up the antidrainback valve means according to the invention, and prior to the lock seaming of lid to can body.

Figure 1:
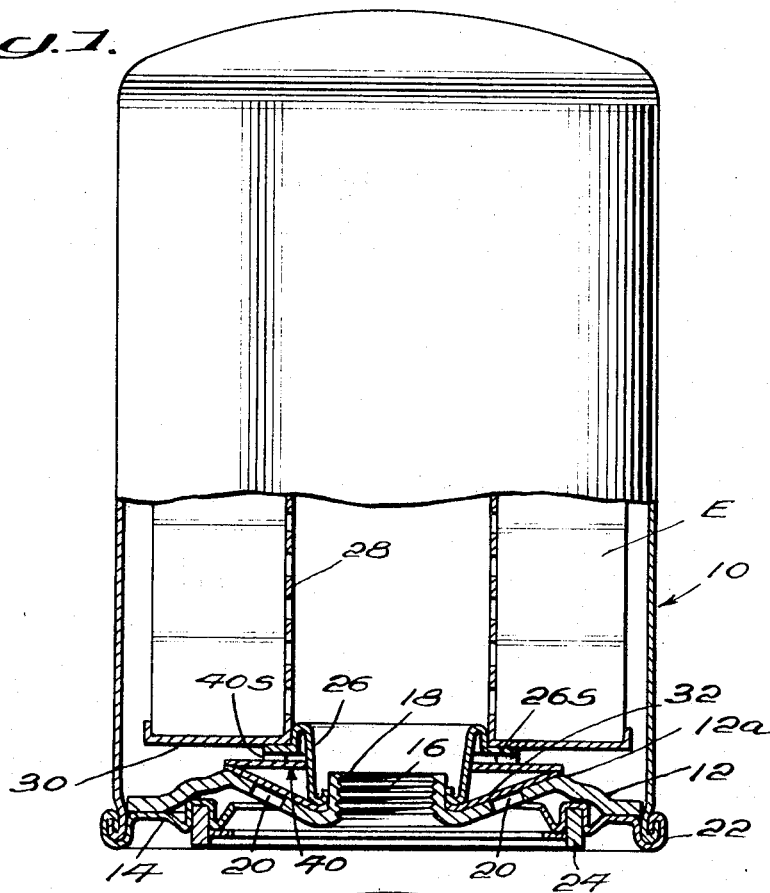
Figure 2:
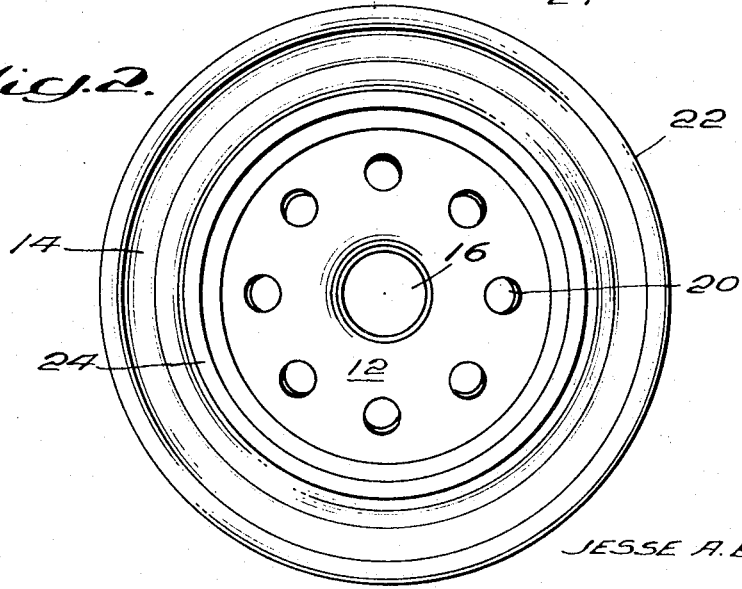
FIG. 2 is a bottom view thereof.

Referring to the drawing in detail, it is explained that for the purpose of simple disclosure the improved antidrainback means of the invention has been illustrated as being incorporated in an automotive oil filter of the so-called disposable or throwaway type. Such a filter comprises an inverted shell or so-called "can" 10 which is closed at top and open on bottom, with said bottom being closed fluidtight by a relatively heavy gauge metal base plate 12 and a lid or cover 14 cooperatively associated therewith. The base plate is formed with a central opening 16 therethrough defined by an integral, axially inwardly directed, cylindrical flange providing a neck 18 which is internally threaded, and with a plurality of smaller size, circumferentially spaced openings 20 extending thereabout on a circle of radius somewhat greater than that of said neck. The cover or lid 14 which is fashioned of relatively thin gauge metal and is preferably in the form of an annulus whose inner edge terminates outwardly of the spaced-apart series of openings 20, is secured against the under face of the base plate 12 as by welding and serves to secure the base plate to the can 10 by being double lock seamed as at 22 to the lower end edge of the can 10 along its outer edge. As is conventional, said cover or lid 14 mounts, in a downwardly opening annular grooved formed therein, a gasket 24 serving to seal the filter as a unit against a raised, planar seating surface on an annular boss (not shown) provided on the block of an automotive engine served by said filter.

An adapter bushing 26 having its lower edge portion turned inwardly on itself on a small radius so as to provide a rounded bottom edge 26a and its upper edge portion turned outwardly on itself also on a small radius as at 26b and thence extended radially outwardly so as to form an upwardly facing step 26s provides a bottom support for a filter element E mounted within the closed can body. More particularly, said filter element seats on the step 26s of the adapter bushing 26, which latter is supported in centered relation about the aforesaid neck on the base plate 12, and it is further biased against said step 26s by spring means (not shown) interposed between the upper closed end of the filter can 10 and the upper end of the filter element.

As the invention is not concerned with the filter element E per se, suffice it to say that it comprises an annular body of a suitable oil filtering media, which can be pleated paper or depth-type media, a perforated center tube 28 and metal end caps (of which the lower end cap designated 30 is shown) rigidly affixed to the opposite ends of said center tube. With the construction so far described, it will be understood that oil from the engine flows through a passage in the engine block into a sealed space (not shown) encircled by the aforementioned annular boss and from thence to the interior of the filter via the plurality of circumferentially spaced openings 20 in the base plate 12 and, after being filtered during the course of its passage through the filter element, returns to the engine block through the center tube 28, the opening 16 in the neck 18 and a corresponding opening in the tubular mounting stud (not shown) threaded into said neck and which serves to physically connect the filter as a unit to said engine block.

The improved antidrainback valve means forming the particular subject matter of the present invention and which functions to prevent oil then within the filter can 10 from draining back into the oil line when the engine and thereby the oil pump is cut out of operation comprises the combination of the aforesaid base plate 12 acting a as a valve seat, the adapter bushing 26 serving both as a valve member securing means and as a valve spring backup means, a valve element 32 for controlling back flow of oil through the base plate openings 20, and a spring means generally designated 40 for normally maintaining said valve member seated.

According to the invention, the base plate 12 is specially configured to provide for its action as aforesaid. More particularly, rather than being planar throughout its radial extent as heretofore, it is instead formed with a circular, upwardly directed, i.e. inwardly of the can, and convexly surfaced hump or ridge 12a, the circle of whose crest has diameter substantially greater than that of the circular series of said oil inlet openings 20 with which said base plate is provided. This new configuration of the base plate also provides for same sloping radially downwardly from the crest circle of said hump or ridge 12a to the lower end of the aforesaid cylindrical neck flange 18, with which it defines an annular radiused corner.

While the general configuration of the adapter bushing 26 has been described, it is to be noted that its inwardly turned or curled lower end portion 26a provides same with a rounded rather than a sharp edge. By design, such rounded edge has diameter enabling it to fit snugly in the aforesaid corner defined by the upper surface of the base plate and its neck flange 18.

The aforesaid valve element 32 per se preferably takes the form of an annulus of flexible rubber or rubberlike material such as neoprene. Said annulus has an inner edge diameter only slightly greater than that of the outer diameter of the base plate neck 18 adjacent its root portion and an outer edge diameter somewhat greater than that of the circle of the crest line of the aforesaid hump or ridge 12a provided in the base plate. Thus, when the valve annulus is threaded over the neck flange 18 to seat against the relatively upper surface of the base plate and thereafter the adapter bushing 26 is assembled to the base plate, the lower rounded edge 26a of said bushing will bear upon the inner edge portion of the valve annulus and in the final filter assembly, firmly secure the valve annulus in position on the base plate.

The aforesaid valve spring means 40 for maintaining the valve annulus 32 normally seated as aforesaid comprises a body member 40a in the form of an annulus of flat spring sheet metal whose central opening has diameter as provides for the accommodation of the body portion of the adapter bushing 26 and whose outer edge diameter is somewhat greater than the circle of the crest line of the aforementioned hump or ridge 12a of the base plate 12. Thus, when the valve element 32, the spring means 40 and the adapter bushing 26 are assembled in that order on the base plate 12, the annular body portion 40a of the spring means is centered by the adapter bushing and its outer edge portion overlies the outer edge or rim portion of the valve annulus 32, which as previously explained in turn overlies the crest line of the aforesaid hump or ridge 12a of the base plate. The spring means 40 also includes a plurality of upwardly inclined, circumferentially extending spring fingers 40s which are struck out from the material of its annular body portion and which extend along a circular zone of radius corresponding to that of the step 26s of the adapter bushing 26. By design, the upward projection of said spring fingers from the annular body member 40a of said spring means is greater than the vertical spacing between the under surface of said step 26s and the plane of the annular body of said spring means, whereby, in the final assembly of the filter including the parts thereof making up the antidrainback valve, the annular valve body 40a is biased in downward direction, thus to press the outer or rim portion of the valve element 32 against the crest line of the circular hump or ridge 12a of the base plate. Thus, it will be seen that the valve annulus 32, rather than being pressed into surface contact with any substantial surface area of the base plate 12, is instead pressed into engagement with said base plate only along the line of the crest circle of the base plate hump or ridge 12a.

The advantages of an antidrainback valve means according to the invention are substantial. Due to the fact that the flexible rubber valve annulus 32 is pressed against the overall valve seating surface of the base plate only along the circular line of the crest of the hump or ridge 12s of the base plate, the possibility of the valve element being held in open or partly open position when it should instead close, due to sizeable dirt particles entrained in the entering oil lodging in the interface between the body portion of the valve annulus and base plate, is positively precluded, such for the reason that lodgement of dirt particles on the circular crest line of the hump 12a of the base plate 12 is a practical impossibility, since any oil flowing over said crest line will inevitably wash away any dirt particles tending to lodge thereon.

The antidrainback valve means of the invention is also notable for its ease of assembly. In explanation, since all of the parts making up same are nonfixedly related one to the other, they may be readily put together simply by erecting one on the other in proper order. Further, because all said parts center one on the other, speedy assembly by unskilled labor without any possibility of misalignment, etc. is possible.

As many changes could be made in carrying out the above constructions without departing from the scope of the invention, it is intended that all matter contained in the above description or shown in the accompanying drawing shall be interpreted as illustrative and not in a limiting sense.

I claim:

1. In an oil filter of the type wherein a filter element is enclosed within an open bottom can body closed by a rigid base plate and supported on a centrally disposed adapter bushing in turn supported on said base plate, and wherein said base plate is provided with a central oil outlet opening and a series of circumferentially spaced oil inlet openings disposed on a circle of diameter greater than that of said central opening, antidrainback valve means comprising:

means on the relatively inner face of said base plate providing a line form seat extending along a circle having diameter greater than that of the circle on which said oil inlet openings are disposed;

a valve annulus of flexible rubberlike material disposed generally flush against the inner face of said base plate and in normal covering relation as respects said oil inlet openings and further having outer edge diameter slightly greater than that of said circular line form seat whereby its outer peripheral portion overlies said seat;

an integral radially outwardly extending flange on the upper end portion of said adapter bushing on which said filter element is directly supported; and spring means reactive between the under face of said flange and the outer peripheral portion of said annulus and operating normally to maintain same seated on said line form seat.

2. Antidrainback valve means according to claim 1, wherein said line form seat comprises the crest line of a circular, relatively inwardly directed, integral ridge provided in said base plate.

3. Antidrainback valve means according to claim 1, wherein said spring means comprises a flat annulus of spring metal having outer edge diameter slightly greater than the circle of said line form seat and being disposed in encircling relation about said adapter bushing and having upwardly inclined, circumferentially extending spring fingers struck out from its inner edge portion and which bear against the under face of said adapter-bushing flange, said spring fingers being in compression thereby causing the peripheral portion of said flat annulus to bear with spring pressure against the outer peripheral portion of the valve annulus and thereby normally maintain same seated on said line form seat.

4. Antidrainback valve means according to clam claim 3, wherein said line form seat comprises the crest line of a circular, relatively inwardly directed, integral ridge provided in said base plate.

UNITED STATES PATENT OFFICE
CERTIFICATE OF CORRECTION

Patent No. 3,557,958                    Dated January 26, 1971

Inventor(s) Jesse A. Baldwin

It is certified that error appears in the above-identified patent and that said Letters Patent are hereby corrected as shown below:

On the cover sheet insert -- [73] assignee J. A. Baldwin Manufacturing Company, Kearney, Nebr., a corporation of Wisconsin --.

Signed and sealed this 9th day of November 1971.

(SEAL)
Attest:

EDWARD M. FLETCHER, JR.           ROBERT GOTTSCHALK
Attesting Officer                  Acting Commissioner of Pate